United States Patent [19]
Haubrich et al.

[11] 4,439,799
[45] Mar. 27, 1984

[54] APPARATUS FOR REPRODUCING INFORMATION RECORDED IN A PLURALITY OF ADJACENT TRACKS

[75] Inventors: Peter Haubrich; Abraham Hoogendoorn; Uwe Jahnke, all of Vienna, Austria

[73] Assignee: U.S. Philips Corporation, New York, N.Y.

[21] Appl. No.: 328,873

[22] Filed: Dec. 9, 1981

[30] Foreign Application Priority Data

Mar. 25, 1981 [AT] Austria .................................. 1398/81

[51] Int. Cl.³ .......................... G11B 5/58; G11B 21/04
[52] U.S. Cl. ...................................... 360/77; 360/10.2; 360/70
[58] Field of Search .......................... 360/10.2, 70, 77

[56] References Cited
U.S. PATENT DOCUMENTS

4,237,500 12/1980 Sanderson ............................ 360/77

Primary Examiner—George G. Stellar
Attorney, Agent, or Firm—Thomas A. Briody; Robert T. Mayer; Algy Tamoshunas

[57] ABSTRACT

A reproducing apparatus for information signals recorded in inclined tracks together with tracking signals whose frequency changes from track to track in a cyclic sequence, comprises a variable-frequency signal generator for the generation of track selection signals, from which together with the crosstalk tracking signals reproduced during a playback mode by at least one rotatable playback head arranged on an electromechanical transducer a transducer actuating signal is derived for tracking purposes, by means of which actuating signal the transducer with the playback head is adjustable between two extreme positions transversely of the tracks. By means of an amplitude discriminator having two threshold values corresponding to the two amplitudes of the actuating signal for deflecting the transducer to its two extreme position, the actuating signal is detected and when the threshold values are exceeded an additional change-over of the track selection signal generation is initiated, which continues until the transducer can guide the playback head along the tracks without reaching one of its extreme positions.

5 Claims, 3 Drawing Figures

APPARATUS FOR REPRODUCING INFORMATION RECORDED IN A PLURALITY OF ADJACENT TRACKS

The invention relates to a reproducing apparatus for information signals recorded on a record carrier in the form of a tape. The information together with tracking signals is recorded in inclined parallel tracks arranged adjacent each other on the tape with the frequency of the tracking signals changing from track to track in a predetermined cyclic sequence. The apparatus comprises at least one rotatable playback head which, for following the tracks, is arranged on an electromechanical transducer, which head when scanning each track also reproduces the tracking signals produced by crosstalk from the two tracks adjacent the track being scanned. The rotary position of the head relative to the record carrier can be detected by means of a position detector, which supplies a position pulse and which is connected to a pulse generator for generating control pulses associated with the position pulses. The control pulses can be applied to a signal generator whose frequency is variable, which signal generator, depending on said control pulses, consecutively generates track selection signals whose frequency changes in the same cyclic sequence as that of the recorded tracking signals. An actuating signal is derived from said track selection signals and the reproduced crosstalk tracking signals in a signal processing circuit, by means of which actuating signal the transducer carrying the playback head is adjustable between two extreme positions substantially transversely of the tracks. Such an apparatus is for example described in DE-OS No. 28 09 402.

In the playback mode of such an apparatus the variable-frequency signal generator consecutively produces track selection signals each time that the rotatable playback head scans the record carrier, an actuating signal for the transducer carrying the playback head being derived from said track selection signals and the reproduced crosstalk track signals. By means of the actuating signal for the transducer the playback head arranged on said transducer is guided along the track defined by the track selection signal generated by the signal generator. Since in principle the position of the playback head relative to the tracks to be scanned, as defined by the instantaneous track selection signals, is also determined by the servo systems provided in the apparatus for the record carrier drive and the drive of the playback head, this may give rise to an unfavourable position of the playback head relative to the tracks to be scanned by said head as defined by the instantaneous track selection signals. In order to follow these tracks the playback head should then be so positioned by means of the transducer that the transducer would have to be deflected beyond its extreme positions. Since a deflection of the transducer beyond its extreme positions is impossible, the occurrence of such an unfavourable situation in the known apparatus results in the playback head incorrectly or not at all following the tracks defined by the instantaneous track selection signal. As a result of this, the reproduction of the information signals recorded in said tracks is impaired, which is obviously and undesirable and adverse effect.

It is the object of the invention to solve the aforementioned problem in a simple, cheap, satisfactory and reliable manner. According to the invention the reproducing apparatus of the type mentioned in the opening paragraph is therefore characterized in that there is provided at least one amplitude discriminator which receives a signal which is proportional to the actuating signal for the transducer. The discriminator has two threshold values corresponding to the two amplitudes of the actuating signal for deflecting the transducer to its two extreme positions and supplies a switching signal when a threshold value is exceeded. The switching signal controls a further pulse generator which, depending on said switching signal, can supply pulses to the signal generator for the additional change-over of the track-selection signal generation. If the transducer now reaches one of its extreme positions, the amplitude discriminator supplies a switching signal, which controls the further pulse generator. The pulses then supplied by the further pulse generator change over the track selection signal generation until the signal generator supplies a track selection signal which corresponds to a track to be scanned along which the transducer can guide the playback head without reaching one of its extreme positions. When the signal generator generates such a track selection signal, the amplitude discriminator no longer produces a switching signal, upon which the additional change-over of the track selection signal generation is terminated. Thus, using simple and cheap means, it is ensured that the playback head can always follow the track defined by the instantaneous track selection signals, without the transducer which carries the playback head reaching one of its extreme positions. Thus, an undisturbed and correct reproduction of the information signals recorded in the tracks is insured. The steps in accordance with the invention can be used not only in a so-called normal playback mode, when the record carrier and the rotatable magnetic head are driven with the same speeds as during recording of the information signals, but also in a playback mode with stationary record carrier, with a stepwise driven record carrier or with a record carrier driven with a speed which is lower or higher than in the recording mode.

The amplitude discriminator may, for example, be designed so that regardless of which of its two threshold values is exceeded it always supplies the same switching signal which controls the further pulse generator, whose pulses start the additional change-over of the signal generator for generating the track-selection signals. However, it is found to be particularly advantageous if the amplitude discriminator is adapted to supply two switching signals each corresponding to one of the two threshold values. Each switching signal controls a further pulse generator, which depending on the switching signals can supply pulses to the signal generator so as to change over the track selection signal generation in the predetermined cyclic sequence depending on the pulses from the one of the two further pulse generators, and in the reversed predetermined cyclic sequence depending on the pulses from the other of the two further pulse generators. Thus, depending on which of the two extreme positions of the transducer is reached, the track selection signal generation is changed over in such a way that very rapidly a track selection signal is obtained which corresponds to a track during whose scanning the transducer does not reach one of its extreme positions. In this way the time required for additionally changing over the track-selection signal generation is minimized so that an undisturbed and correct reproduction of the information signals is readily achieved.

In order to minimize the number of circuit elements it is found to be advantageous if in an apparatus comprising at least two playback heads, which are each arranged on a transducer, and at least two amplitude discriminators, which are adapted to supply two switching signals each corresponding to one threshold value. The switching signals corresponding to the same threshold values of the amplitude discriminators, together control a further pulse generator. In this way it is achieved that each of said amplitude discriminators is not followed by two further pulse generators, but that both amplitude discriminators together control only two further pulse generators, which is simple and cheap.

For a simple circuit design it is found to be advantageous if in an apparatus comprising at least two playback heads, each arranged on one transducer, there is provided a single amplitude discriminator, which receives a signal which is proportional to the actuating signals for all the transducers. This results in a particularly simple construction.

As already stated, the additional change-over of the track selection signals by the pulses from the further pulse generator continues as long as a transducer occupies one of its extreme positions. Suitably, this continuous change-over should be effected at time intervals which essentially correspond to the period of time which has elapsed after the additional change-over to an other track selection signal in order to derive the actuating signal from said track selection signal. This may, for example, be achieved in that the supply of pulses by the further pulse generator to the signal generator for the generation of the track selection signals is interrupted by means of a separate switching device for said period of time. However, in this respect it is found to be advantageous for a simple construction if the further pulse generator supplies consecutive pulses having a period which is at least equal to the period of time which has elapsed after the additional change-over to an other track selection signal in order to derive the actuating signal from said track selection signal. Thus, without additional steps, positioning a playback head arranged on a transducer on a track along which the transducer can guide the playback head without reaching one of its extreme positions is greatly simplified.

Two embodiments of the invention, which are shown in the drawings and to which the invention is not limited, will be described in more detail hereinafter.

Figure 1:
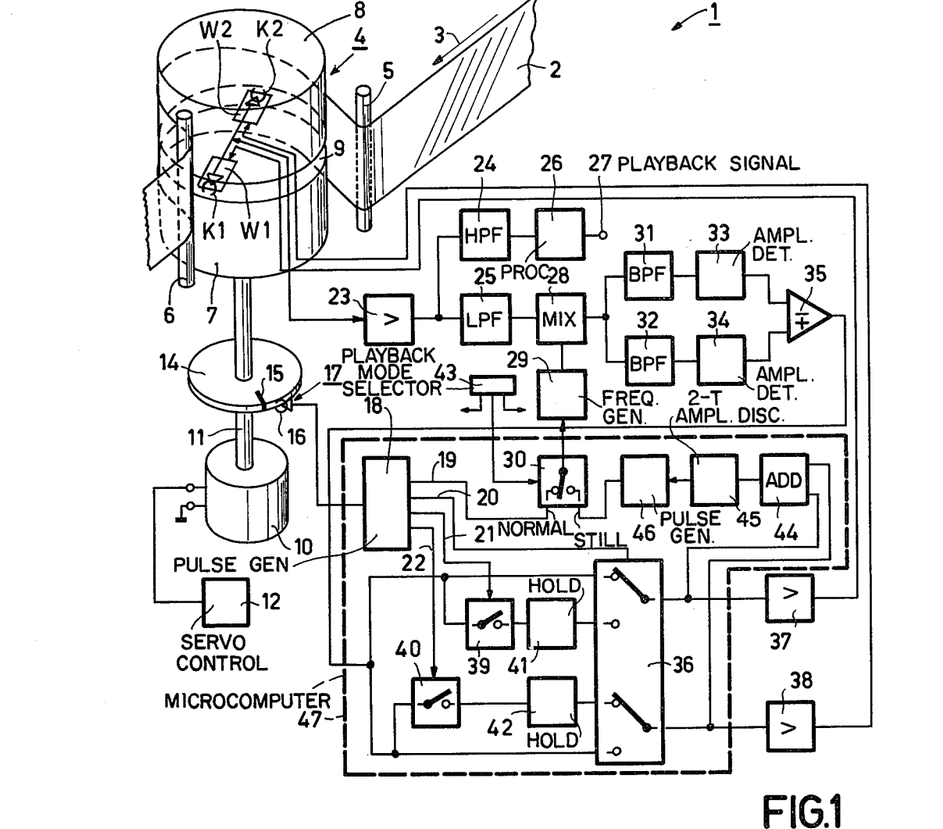
FIG. 1 schematically shows that part, which is relevant to the invention, of a first embodiment of a reproducing apparatus in accordance with the invention for information signals recorded on a record carrier in oblique tracks.
Figure 2:
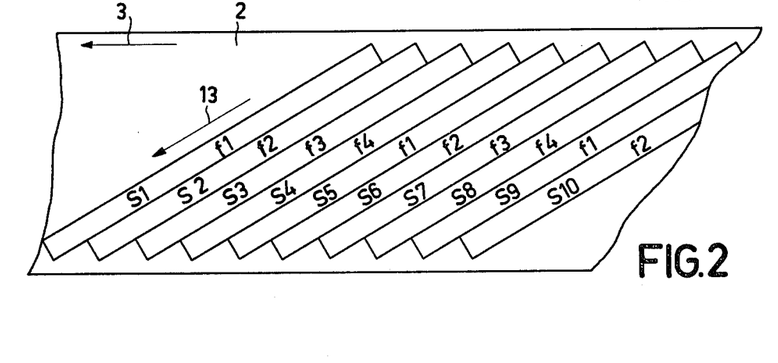
FIG. 2 represents a track configuration of the record carrier for the apparatus of FIG. 1.

FIG. 1 shows a part of a reproducing apparatus 1 for information signals, such as for example television signals, recorded on a magnetisable record carrier 2 in the form of a tape, by means of which apparatus it is also possible to reproduce the information signals when the record carrier is stationary. The information signals are recorded on the record carrier 2 in parallel adjacent tracks S1, S2, S3, S4, S5, S6, S7, S8, S9, S10 etc., which are inclined relative to the longitudinal direction of the record carrier 2, as is shown in FIG. 2. Together with the information signals tracking signals are recorded in the tracks, the frequency of said tracking signals changing from track to track in a predetermined cyclic sequence. In the present case four tracking signals of the frequencies f1, f2, f3 and f4 are recorded in a cyclic sequence in consecutive tracks S1, S2 etc., as is indicated in FIG. 2.

The record carrier 2, which can be driven, in known manner, with a constant speed in the direction of the arrow 3 by means of a capstan and a pressure roller, is wrapped around a drum-shaped tape guide 4 comprising two parts, the wrapping path being defined by means of two schematically represented pin-shaped tape guides 5 and 6. The drum-shaped tape guide 4 comprises a stationary guide cylinder 7 and a rotatable guide cylinder 8. Between the two guide cylinders a gap 9 is formed, through which two playback heads K1 and K2, which are adjustably arranged on the rotatable guide cylinder 8 can alternately cooperate with the record carrier 2, which is wrapped around the tape guide 4. Each of the two heads K1 and K2 is arranged on an electromechanical transducer W1 and W2 respectively, by means of which the heads are adjustable substantially transversely of the tracks direction, in order to ensure that the heads correctly follow the tracks. The electromechanical transducers W1 and W2 may for example comprise piezo-electric bimorph strip elements, but may alternatively operate in accordance with an electromagnetic principle.

In order to drive the guide cylinder 8 there is provided a motor 10, whose motor shaft 11 is connected to the guide cylinder 8. The motor 10 is connected to a servo control circuit 12, which ensures that the motor is driven in an anti-clockwise direction of rotation with a predetermined constant speed of rotation. The speed and direction of rotation of the motor 10 and thus of the playback heads K1 and K2 and the speed of transport of the record carrier 2 are selected in such a way that in a normal playback mode the rotary playback heads K1 and K2 consecutively cooperates with the record carrier during a predetermined scanning period, thereby alternately scanning the tracks S1, S2, S3 etc., in the direction of the arrow 13 in FIG. 2 and thus reproducing the information signals recorded therein. When each track is scanned by a playback head said head not only reproduces the information signals and the tracking signal recorded in said track, but also the tracking signals produced by crosstalk from the two tracks adjacent the track being scanned. This is achieved by a suitable choice of the frequency of the tracking signals, which—as is known from the prior art—are selected to have a comparatively long wavelength relative to the information signals. This may be clarified by the following example: If a playback head scans the track S6, the information signals and the tracking signal of the frequency f2 as well as the tracking signals of the frequencies f1 and f3 produced by crosstalk from the tracks S5 and S7 are reproduced.

On the motorshaft 11 a disk 14 is mounted, which carries a small magnet 15. Near the path of the magnet 15 a stationary magnetic head 16 is arranged, in which position pulses are induced by the magnet 15 when the disk 14 rotates. Since the position of the magnet 15 on the disk 14 is in a fixed relationship to the position of the playback heads K1 and K2, the magnet 15 and the magnetic head 16 constitute a position detector 17, which supplies position pulses from which the rotary position of the two playback heads K1 and K2 relative to the record carrier can be derived. Since the playback heads K1 and K2 rotate in a specific relationship to the record carrier 2, it is possible to determine from the position pulses supplied by the position detector 17 at which instant each of the two magnetic heads begins to scan a track. In the present case the position detector is of an inductive type, but it is obvious that alternatively a capacitive or photoelectric position detector may be used.

Connected to the position detector 17 is a pulse generator 18 for generating control pulses corresponding to the position pulses from the position detector. The pulse generator 18 comprises four output lines 19, 20, 21 and 22. The pulse generator 18 produces control pulses on the output line 19, from which at the instants at which the two playback heads K1 and K2 begin to scan a track a control command is derived. On the output line 20 the pulse generator 18 produces control pulses whose duration is equal to the scanning period of the two playback heads and which occur each time that the playback head K2 scans a track. On the output line 21 the pulse generator 18 produces brief control pulses which occur when the playback head K1 begins to scan a track and on the output line 22 it produces brief control pulses which occur when the playback head K2 begins to scan a track. The pulse generator 18 may, for example, comprise an arrangement of monostable multivibrators, which are triggered by the position pulses from the position detector 17.

In known manner, the playback heads K1 and K2 are connected to a preamplifier 23 via a rotary transformer, not shown for the sake of simplicity, a high-pass filter 24 and a low-pass filter 25 being connected to the output of said preamplifier. By means of the high-pass filter 24 the information signals of higher frequency are extracted from the mixture of information signals and tracking signals reproduced by the playback heads, which information signals are further processed in a signal processing circuit 26 which follows the high-pass filter, so that on the output 27 of the signal processing circuit only signals appear which, in the case that the information signals are television signals, are suitable for reproduction on a television receiver.

The low-pass filter 25 extracts the tracking signals from the signal mixture reproduced by the playback heads K1 and K2. The extracted tracking signals are applied to an input of a mixing stage 28 whose other input receives track selection signals, which are generated by a signal generator 29 whose frequency is switchable. The control pulses produced on the output line 19 by the signal generator 18 can be applied to the signal generator 29 via a switching device 30 which is in a first switching position. The generator 18 in dependence on said control pulses generates consecutive track selection signals whose frequency changes in the same cyclic sequence as the recorded tracking signals. In this case the frequencies of the track selection signals correspond to those of the tracking signals, but this is not necessary. A signal processing circuit derives an actuating signal from the track selection signals and the reproduced crosstalk tracking signals. By means of the actuating signal each transducer W1 or W2 with the playback head K1 or K2 arranged thereon is adjustable substantially transversely of the tracks between two extreme positions, in order to ensure that the playback heads follow the tracks defined by the track selection signals. The signal generator 29, as is known from the prior art, comprises a so-called programmable generator, which in response to external control commands, such as the control pulses from the pulse generator 18, supplies signals of different frequency. Such a generator may comprise a plurality of oscillators, the oscillator signals being alternately available on the generator output. Alternatively, there may be provided one oscillator, from whose output signal track selection signals of different frequency can be derived by frequency division with different dividing ratios.

As already stated, a signal processing circuit derives an actuating signal for the transducers W1 and W2 from the track selection signals and the reproduced crosstalk tracking signals, in order to ensure that the playback heads K1 and K2 follow the tracks defined by the track selection signals. Such a signal processing circuit is also known, so that its construction and operation will only be described briefly hereinafter. The signal processing circuit comprises the mixing stage 28 already mentioned, in which mixing products of the track selection signals and the crosstalk tracking signals are formed. The mixing stage 28 is followed by two band-pass filters 31 and 32, one of the band-pass filters allowing a mixing product of a track selection signal and one of the crosstalk tracking signals to pass through and the other band-pass filter allowing the mixing product of a track selection signal and the other cross-talk tracking signal to pass through. Each of the two band-pass filters 31 and 32 is followed by an amplitude detector 33 or 34 respectively for detecting the amplitude of the said mixing products. The output signals of the amplitude detectors 33 and 34 are applied to a differential stage 35, on whose output the said actuating signal for the transducers W1 and W2 is available.

The actuating signal appearing on the output of the differential stage 35 is fed to a further switching device 36, which in its first switching position, which is symbolically represented in FIG. 1 and during which the playback head K1 scans a track, feeds the actuating signal to the transducer W1 via a first amplifier stage 37 and a slip-ring contact, not shown, and in its second position, during which the playback head K2 scans a track, feeds the actuating signal to the transducer W2 via a second amplifier stage 38 and a further slip-ring contact. The switching device 36, which is of course constituted by an electronic circuit, is controlled by control pulses produced on the output line 20 of the pulse generator 18 by said generator.

Furthermore, series arrangements of a switching stage 39 or 40 and a memory stage 41 or 42 are connected to the output of the differential stage 35. Each of said series arrangements constitutes a so-called sample-and-hold circuit. By suitably controlling the switching stages 39 and 40 by means of the control pulses produced on the output lines 21 and 22 of the pulse generator 18, it is insured that the two memories 41 and 42 each time store the initial value of the actuating signal at the beginning of a scan by the playback head K1 or K2 respectively. The initial value of the actuating signal for the transducer W1 stored in the memory 41 is then applied to the transducer W1 via the switching device 36, which is in its second position, and the amplifier stage 37 during the time interval in which the playback head K1 does not cooperate with the record carrier. Similarly, the initial value of the actuating signal for the transducer W2 stored in the memory 42 is applied to the transducer W2 via the switching device 36, which is in its first position, and the amplifier stage 38 during the time interval in which the playback head K2 does not cooperate with the record carrier.

As is apparent from the foregoing, the operation of the reproducing apparatus shown in FIG. 1 is based on the fact that by means of a track selection signal available during a scanning period the playback head K1 or K2 which cooperates with the record carrier in said scanning period is made to follow the track defined by the predetermined track selection signal. This is achieved in that an actuating signal is derived from the predetermined track selection signal and the reproduced crosstalk tracking signals, which actuating signal is applied to the respective transducer W1 or W2, so that said transducer is so adjusted that the playback head K1 or K2 carried by the transducer is made to follow the track defined by the track selection signal.

However, if the transducer carrying a playback head receives no actuating signal, owing to the position of the playback head relative to the record carrier, it may happen that said playback head scans a specific track, for example track S6, but that the signal generator 29 supplies a track selection signal of the frequency f4, so that the transducer would have to adjust the playback head arranged on it by two track widths in order to ensure that the playback head can follow a track defined by the track selection signal of the frequency f4. However, as already stated, each transducer can only be adjusted between two extreme positions, which obviously depend on its construction, its drive range etc. If now in the case of an unfavourable position of the playback head relative to the track to be scanned by the playback head and defined by the predetermined track selection signal, for example as mentioned in the foregoing, when the playback head is made to follow said track, one of said extreme positions of the transducer is exceeded, this would result in the playback head no longer being capable of reproducing the information signals recorded in the track to be scanned in a satisfactory manner or not at all. This problem occurs not only during a normal playback mode, in which the record carrier 2 and the playback heads K1 and K2 are driven in the same way as during the corresponding recording mode, but also in the event of reproducing modes deviating therefrom, such as for example, during a playback mode with stationary record carrier, so-called still reproduction of television signals. The steps in accordance with the invention in order to solve the problems mentioned in the foregoing will be described in detail hereinafter for such a playback mode with stationary record carrier, for which the reproducing apparatus of FIG. 1 is also suitable.

The reproducing apparatus comprises a switch 43, represented schematically, for starting a playback mode with stationary record carrier. The switch 43, in a manner not shown, initiates the operations necessary for this playback mode, such as switching off the record carrier drive, switching over the speed of the motor for driving the playback heads etc. By means of the switch 43 it is also possible to switch the switching device 30, which is obviously also of an electronic type, from its first switching position to its second switching position. Switching the switching device 30 to its second switching position in a playback mode with stationary record carrier, interrupts the supply of control pulses from the pulse generator 18, via the output line 19, to the signal generator 29 for the generation of track selection signals, so that the cyclic switching of the track selection signals is also interrupted. In a playback mode with stationary record carrier this is also necessary, because in said mode the playback heads consecutively scan the same track, so that in fact the same track selection signal should be applied continuously.

From the two actuating signals for the transducers W1 and W2 applied to the two amplifier stages 37 and 38 a signal which is proportional to the relevant actuating signal is derived and applied to an adder stage 44. The adder stage may then for example simply comprise two isolating resistors or alternatively two isolating amplifiers or it may be of any other suitable design. The signal supplied by the adder stage 44 and proportional to the actuating signal for the two transducers is fed to an amplitude discriminator 45, which discriminator has two threshold values corresponding to the two amplitudes of the actuating signal when each transducer W1 or W2 has been deflected to its two extreme positions and which discriminator supplies a switching signal each time that the threshold value is exceeded. Since in the present case the amplitude discriminator receives a signal which is proportional to the sum of the two actuating signals each threshold value of the amplitude discriminator is in fact selected to correspond to twice the amplitude of the actuating signal for moving a transducer to one of its extreme positions. The amplitude discriminator, which may for example be comprised by the integrated circuit which is commercially available under the type designation TCA 965, then supplies the same switching signal whichever of the two threshold values is exceeded.

The switching signal from the amplitude discriminator 45 controls a further pulse generator 46, which depending on said switching signal supplies pulses for an additional change-over of the track selection signal generation to the signal generator 29 for generating the track selection signals. The further pulse generator 46 then supplies consecutive pulses with a period which is at least equal to the time elapsing after the additional change-over to an other track-selection signal in order to derive the actuating signal from said track selection signal. The further pulse generator may for example comprise an astable multivibrator, which supplies pulses of the said period as long as the switching signal from the amplitude discriminator is applied to said multivibrator or alternatively an astable multivibrator which constantly supplies pulses of the said period to a gate circuit, which is turned on and transfers the pulses from the astable multivibrator only during the occurrence of the switching signal.

The pulses from the further pulse generator 46 are applied to the signal generator 29 via the switching device 30, which device is in its second switching position if the apparatus is set to the playback mode with stationary record carrier. Obviously, the further pulse generator 46 may alternatively supply its pulses to the pulse generator 18, which is controlled by the position pulses and then also supplies pulses for the additional change-over of the track-selection signal generation to the signal generator 2 via the switching device 30, which is in its second switching position. It s also conceivable that the further pulse generator 46 is combined with the pulse generator 18 to form a single pulse generator circuit. The pulses from the further pulse generator 46 are applied to the same control input of the signal generator 29 as the control pulses produced on the output line 19 by the pulse generator 18. This means that the pulses from the further pulse generator 46 switch the track selection signal generation in the same cyclic sequence as the control pulses from the pulse generator 18. Obviously, the pulses from the further pulse generator may also be applied to a separate control input of the signal generator 29, in which case the additional change-over of the track selection signal generation can be effected in any desired sequence, for example in a sequence which is the reverse of said cyclic sequence or in such a way that during the additional change-over only every second track selection of the cyclic sequence is selected, etc.

With respect to the design of the individual sections of the reproducing apparatus 1 it is to be noted that it is alternatively possible to provide a programmable unit, such as a so-called microcomputer. In FIG. 1 a broken line 47 surrounds those sections of the apparatus which are particularly suitable to be formed by means of a programmable unit, the individual sections being constituted by corresponding digital elements.

In the reproducing apparatus 1, starting for example from a normal playback mode with moving record carrier, a playback mode with stationary record carrier can be selected by actuation of the switch 43. The record carrier transport is then stopped and the supply of control pulses from the pulse generator 18 to the signal generator 29 is interrupted, so that the signal generator then continuously supplies the same track selection signal. This track selection signal then defines which of the tracks should be followed continuously by the playback heads during a playback mode with stationary record carrier. As a result of an unfavourable position of the playback head relative to the track defined by the track selection signal it may happen, as already stated, that the transducers W1 and W2, owing to their actuating range which is limited between two extreme positions, cannot satisfactorily or not at all guide the playback head along the track defined by the track selection signal. The actuating signal for the transducers then has a value which is higher than the value which the actuating signal has for deflecting the transducer to one of its extreme positions. However, since the threshold values of the amplitude discriminator have been selected in conformity with these amplitudes of the actuating signals for the transducer, the amplitude discriminator 45 will then supply a switching signal, after which the further pulse generator 46 for the additional change over of the track selection signal generation supplies consecutive pulses to the signal generator 29, the period of said consecutive pulses being at least equal to the time which elapses after the additional change-over to a further track selection signal in order to derive the actuating signal from this track selection signal.

The first one of the pulses from the further pulse generator 46 causes a first additional change-over the signal generator 29, namely in the same cyclic sequence as the tracking signals. The new track selection signal now formed causes the formation of a new actuating signal in the signal processing circuit, which signal attempts to position the playback heads on the track adjacent to that defined by the track selection signal now supplied. The formation of this new actuating signal obviously demands a certain amount of time, which for example depends on the limit frequency of the signal processing circuit etc. If despite the first additional change-over of the signal generator and the consequent formation of the new actuating signal the transducers still reach one of their extreme positions, the amplitude discriminator 45 supplies a further switching signal. As a result of this, the further pulse generator 46 supplies a second pulse to the signal generator 29, so that the next track selection signal of the cyclic sequence is produced. This again results in the formation of a new actuating signal. This process continues until an actuating signal is formed by means of which the transducers can position the playback head on a track without the transducers reaching their extreme positions. If the transducers no longer reach their extreme positions when the playback heads are positioned on the tracks defined by the last track selection signal supplied, the amplitude discriminator no longer supplies a switching signal, so that the further pulse generator no longer delivers any further pulses to the signal generator 29. The process of the additional change-over of the signal generator 29 for the generation of the track selection signals is then terminated.

In the following another, brief example is given. It is assumed that upon selection of the playback mode with stationary record carrier the playback heads occupy a position relative to the stationary record carrier in which, if no actuating signal were applied, they would in principle scan the track S5, but that the signal generator 29 supplies a track selection signal of the frequency f3. As a result of this the heads are for example made to follow the track S7, which is impossible because of their limited actuating range between their two extreme positions. Since the amplitude discriminator 45 now supplies a switching signal to the further pulse generator 46, said pulse generator supplies pulses for the additional changeover of the track selection signal generation to the signal generator 29. Upon application of the first pulse from the further pulse generator 46 the signal generator 29 is changed over for a first time in the said cyclic sequence in order to generate the track selection signal of the frequency f4, as a result of which the playback heads should now scan the track S8. However, this would demand a even larger deflection of the transducers. Since this is not possible the amplitude discriminator 45 supplies another switching signal, so that the further pulse generator 46 supplies a second pulse to the signal generator 29. Said generator is now switched to the generation of the track selection signal of the frequency f1 in the cyclic sequence. As a result, an actuating signal for the transducers is derived from the track selection signal of the frequency f1, by means of which signal the playback heads are transferred to a track defined by the track selection signal of the frequency f1 and are made to scan said track. However, this is the track S5, which the playback heads would also scan without the application of an actuating signal to the transducers, as was assumed in the foregoing. Since in this case the transducers do not reach their extreme positions, the amplitude discriminator 45 does not supply a switching signal and the further pulse generator 46 does not supply any further pulses to the signal generator 29. Consequently, the playback heads are now guided along the track S5 by the transducers, which track is scanned continually when the playback mode with stationary record carrier has been selected.

As is apparent from the foregoing, the steps in accordance with the invention ensure that in a particularly simple manner and with a minimum amount of circuitry the playback heads are guided along a track by the transducers, without the transducers reaching one of their extreme positions. Thus, it is always guaranteed that the playback heads reproduce the information signals recorded in the tracks to be scanned correctly and without interference. By adding the signals which are proportional to the actuating signals for the two transducers by means of an adder stage it is achieved that the desired result is obtained by means of a single amplitude discriminator and only one further pulse generator, which results in a simple and cheap circuit design. Since the further pulse generator supplies pulses of a period as specified in the foregoing, it is ensured that, in a simple manner and without additional means, enough time is available after each additional switching operation to detect whether said switching operation yields the desired result.

Figure 3:
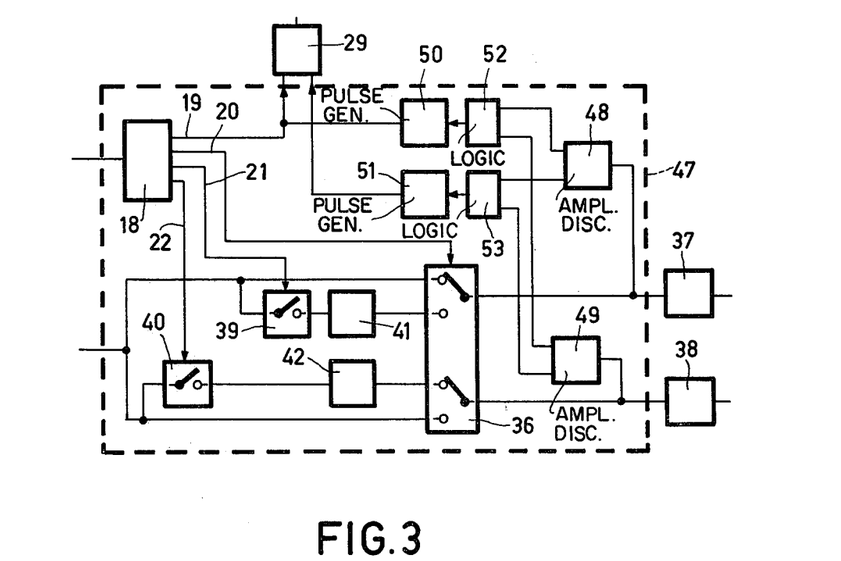
FIG. 3 shows part of a second embodiment of a reproducing apparatus in accordance with the invention.

The reproducing apparatus of FIG. 3 is intended only for a normal playback mode, in which the record carrier is driven with the same speed as during the recording mode. This apparatus comprises two amplitude discriminators 48 and 49. The amplitude discriminator 48 receives a signal which is proportional to the actuating signal for the transducer W1 and the amplitude discriminator 49 receives a signal which is proportional to the actuating signal for the transducer W2. Thus, each of the actuating signals for the two transducers is monitored separately. Each amplitude discriminator 48 or 49 is adapted to supply two switching signals, each corresponding to one threshold value, on two outputs. Such an amplitude discriminator may, for example, comprise two differential amplifiers each having an inverting and a non-inverting input, the non-inverting input of the one differential amplifier being connected to the inverting input of the other differential amplifier and constituting the input of the amplitude discriminator and the other inputs of the two differential amplifiers each receiving a bias which defines a threshold value, the two outputs of the differential amplifiers constituting the two outputs of the amplitude discriminator. The two switching signals from each amplitude discriminator 48 or 49 each control a further pulse generator 50 or 51 respectively, which depending on the switching signals can supply pulses to the signal generator 29 for the generation of the track selection signals, which pulses, depending on the pulses from the one further pulse generator, 50 change over the track selection signal generation in the predetermined cyclic sequence and, depending on the pulses from the other pulse generator 51, change over the track selection signal generation in the reverse predetermined cyclic sequence. For this purpose the further pulse generator 50 supplies its pulses to the same control input of the signal generator 29 as the pulse generator 18, and the further pulse generator 51 supplies its pulses to a further control input of the signal generator 29. The signal generator 29 then again comprises a programmable generator, which can now be set to forward or reverse operation, depending on which of its two control inputs corresponding control pulses appear.

As is shown in FIG. 3, steps have been taken to ensure that in this apparatus the switching signals which correspond to the same threshold values of the amplitude discriminators 48 and 49 together control a further pulse generator 50 or 51. For this purpose the switching signals appearing on corresponding outputs of the amplitude discriminators 48 and 49 are each applied to a logic stage 52 or 53, whose outputs are each connected to one of the further pulse generators 50 and 51. The logic stages 52 and 53 may for example comprise adder stages or gate circuits, such as an OR-gate. In the apparatus of FIG. 3 it is again possible to construct the sections surrounded by the broken line 47 as a programmable unit.

The operation of this apparatus is similar to that of the apparatus described with reference to FIG. 1, the additional change-over of the signal generator being effected during the normal playback mode. In this apparatus it is also detected which of the two extreme positions is reached by the transducers. It is detected which of the two threshold values of the amplitude discriminators is exceeded by the actuating signals for the transducers and, depending on this, the additional change-over of the track selection signal generation is selected to proceed in such a sequence that the actuating signals for the transducers are reduced immediately, so that the playback heads can be made to follow a specific track very rapidly without the transducers reaching one of the extreme positions. By the logic combination of the switching signals of the amplitude discriminators it is achieved that the desired result is obtained using only two further pulse generators.

Obviously, several modifications to the embodiment described in the foregoing are possible without departing from the scope of the invention. For example, in an apparatus in accordance with FIG. 1 it is alternatively possible to monitor only the actuating signal for one of the transducers. In addition, the signal can be generated by means of that amplitude discriminator which receives the signals from the memories for storing the initial value of the actuating signal. Furthermore, the amplitude discriminator for detecting the actuating signals in the apparatus of FIG. 1 may also be adapted to supply two switching signals, which each control one of two further pulse generators, whose pulses switch over the signal generator for the generation of the track selection signal in a reverse sequence. The apparatus of FIG. 3 may comprise only one amplitude discriminator, which may monitor only one of the actuating signals or, alternatively, both actuating signals for the two transducers. Alternatively, the apparatus of FIG. 2 may comprise two amplitude discriminators, which each supply only one switching signal, said two switching signals together controlling only one further pulse generator. It is evident that the steps in accordance with the invention may also be applied to an apparatus comprising more than two playback heads and also to an apparatus comprising, for example, two playback heads whose head gaps have different azimuth angles. In the last-mentioned case, in which each playback head can only scan a track in which information signals have been recorded by means of a head having the same azimuth angle, a track-selection-signal pair is, for example, supplied during a playback mode with a stationary record carrier in a cyclic sequence, the additional change-over of the signal generator resulting in the generation of a new track-selection-signal pair.

What is claimed is:

1. An apparatus for reproducing information signals recorded on a record carrier in the form of a tape in inclined parallel tracks arranged adjacent each other, wherein together with said information signals tracking signals are recorded in said tracks, said tracking signals having a frequency which changes from track to track in a predetermined cyclic sequence, which apparatus comprises at least one rotatable playback head which, for following the tracks, is arranged on an electromechanical transducer, which head when scanning each track also reproduces tracking signals produced by cross talk from the two tracks adjacent the track being scanned, a position detector for detecting the rotary position of the head relative to the record carrier, which position detector supplies a position pulse and is connected to a pulse generator for generating control pulses associated with the position pulses, which control pulses are applied to a signal generator whose frequency is variable, which signal generator, depending on said control pulses, consecutively generators track selection signals whose frequency changes in the same cyclic sequence as the recorded tracking signals, a signal processing circuit which derives an actuating signal from said track selection signals and the reproduced crosstalk tracking signals, by means of which actuating signal the transducer carrying the playback head is adjustable between two extreme positions substantially transversely of the tracks, characterized in that there is provided at least one amplitude discriminator, means for supplying to said amplitude discriminator a signal which is proportional to the actuating signal for the transducer, said discriminator having two threshold values corresponding to the two amplitudes of the actuating signal which deflect the transducer to its two extreme positions, which discriminator supplies a switching signal when a threshold value is exceeded, which switching signal controls a further pulse generator which, depending on said switching signal, supplies pulses to said signal generator causing an additional change-over in the track selection signal generation.

2. A reproducing apparatus as claimed in claim 1, characterized in that two of said further pulse generators are provided and the amplitude discriminator is adapted to supply two switching signals each corresponding to one of the two threshold values, which switching signals each control a respective further pulse generator which in dependence on the switching signals supply pulses to the signal generator, said signal generator changing over the track selection signal generation according to said predetermined cyclic sequence in dependence on the pulses from one of the two further pulse generators, and in the reversed predetermined cyclic sequence in dependence on the pulses from the other of the two further pulse generators.

3. A reproducing apparatus as claimed in claim 2, characterized in that said apparatus comprises at least two playback heads each arranged on a transducer, and at least two amplitude discriminators each adapted to supply said two switching signals, the switching signals corresponding to the same threshold value together controlling a respective further pulse generator.

4. A reproducing apparatus as claimed in claim 1 or 2, characterized in that said apparatus comprises at least two playback heads, each arranged on one transducer, and there is provided a single amplitude discriminator, which receives a signal which is proportional to the actuating signals for all the transducers.

5. A reproducing apparatus as claimed in claims 1, 2 or 3, characterized in that the further pulse generator supplies consecutive pulses having a period which is at least equal to the period of time which has elapsed after the additional change-over to another track selection signal in order to derive the actuating signal from said track selection signal.

* * * * *

UNITED STATES PATENT AND TRADEMARK OFFICE
CERTIFICATE OF CORRECTION

PATENT NO. : 4,439,799
DATED : March 27, 1984
INVENTOR(S) : PETER HAUBRICH ET AL It is certified that error appears in the above-identified patent and that said Letters Patent is hereby corrected as shown below:

Claim 1, line 20, change "generators" to

-- generates--

Signed and Sealed this

Twenty-sixth Day of March 1985

[SEAL]

Attest:

DONALD J. QUIGG

Attesting Officer    Acting Commissioner of Patents and Trademarks